(12) United States Patent
Agudelo

(10) Patent No.: US 7,584,559 B2
(45) Date of Patent: Sep. 8, 2009

(54) SHOPPING CARD NOTEPAD HOLDER

(76) Inventor: Esther Agudelo, 9687 SW. 147 Ct., Miami, FL (US) 33196

( * ) Notice: Subject to any disclaimer, the term of this patent is extended or adjusted under 35 U.S.C. 154(b) by 45 days.

(21) Appl. No.: 12/009,017

(22) Filed: Jan. 16, 2008

(65) Prior Publication Data
US 2009/0179415 A1    Jul. 16, 2009

(51) Int. Cl.
*G09F 3/00*    (2006.01)
(52) U.S. Cl. ............ 40/308; 40/336; 248/346.03
(58) Field of Classification Search ............ 40/308, 40/666, 611.01, 607.03, 607.1, 607.12; 248/163.1, 248/188.5; 403/304, 359.1–359.6; 280/33.992; 434/408, 428–430; 224/409, 411; 446/227
See application file for complete search history.

(56) References Cited

U.S. PATENT DOCUMENTS

| | | | |
|---|---|---|---|
| 1,697,025 A * | 1/1929 | Searle ............... 40/607.12 |
| 2,670,918 A * | 3/1954 | Kinnard ............... 248/188.5 |
| 3,881,267 A * | 5/1975 | Hicks ............... 40/308 |
| 4,356,651 A | 11/1982 | Barlow | |
| 4,685,701 A | 8/1987 | Amundson et al. | |
| 4,743,050 A * | 5/1988 | Small ............... 281/45 |
| 4,988,025 A * | 1/1991 | Lipton et al. ............... 224/411 |
| 5,425,546 A * | 6/1995 | Gerber et al. ............... 280/33.992 |
| 6,299,119 B1 * | 10/2001 | Dunning ............... 248/346.03 |

* cited by examiner

*Primary Examiner*—Lesley D. Morris
*Assistant Examiner*—Shin Kim
(74) *Attorney, Agent, or Firm*—Ruben Alcoba, Esq.

(57) ABSTRACT

A shopping cart notepad holder. The allows a user of a shopping cart to have the option of using the holder as a holder of a shopping list while at the same time providing a child with a writing surface. The shopping cart notepad holder comprises a first notepad holder, the notepad holder has a first lateral attachment guide, a second notepad holder, the second notepad holder has a second lateral attachment guide, the second lateral attachment guide is mounted on the first attachment guide, and a retractable arm system for attaching the shopping cart notepad holder to a shopping cart, the retractable arm system is housed within and is attached to the first lateral attachment guide.

11 Claims, 9 Drawing Sheets

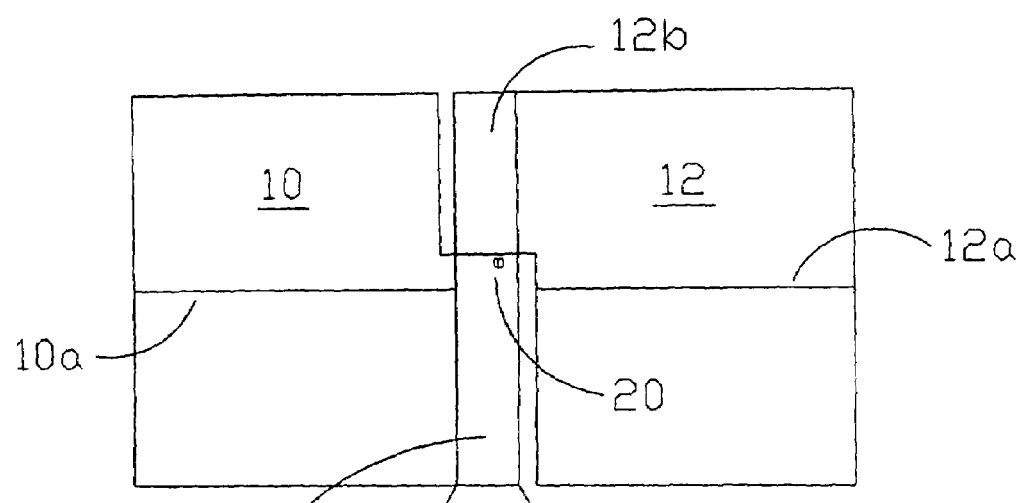
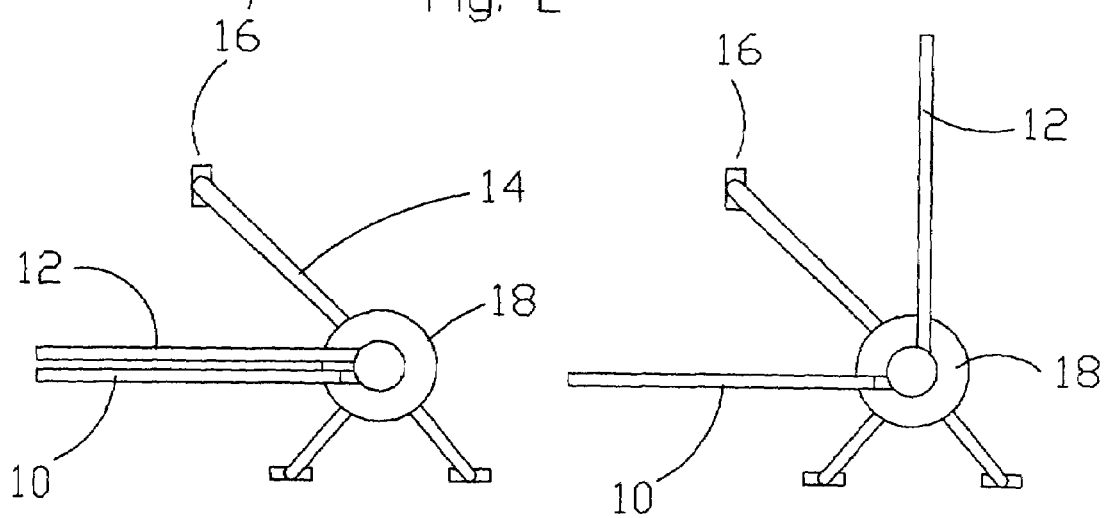
Fig. 2
Fig. 3
Fig. 4

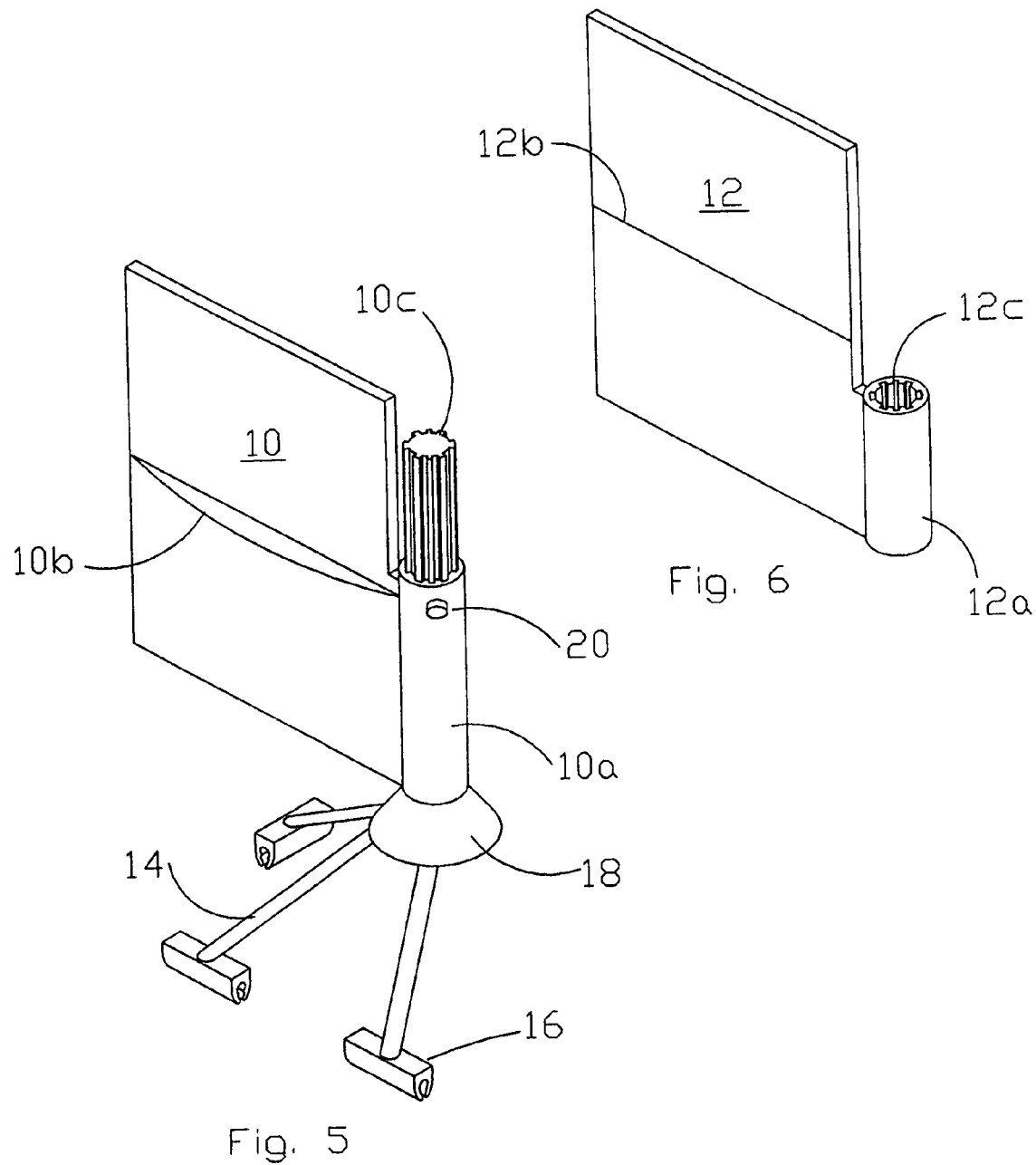

SHOPPING CARD NOTEPAD HOLDER

BACKGROUND

The present invention is a shopping cart notepad holder. The holder was designed to allow a user of a shopping cart to have the option of using the holder as a holder of a shopping list while at the same time providing a child with a writing surface.

The invention was designed by a mother who realized that she needed to have a shopping cart notepad holder that would also allow her to entertain her child while shopping.

Prior to conceiving her invention, the inventor, when shopping, would usually carry a loose piece of paper or a small notepad in her hand that would remind her of the groceries she wanted to purchase. Having a child, carrying the notepad, caring for the child, finding items in the grocery store, and keeping track of what items were found in the grocery store was a difficult task, for it was difficult for her to cross things off the grocery list as she shopped and also because the child would sometimes want to play with the grocery list.

The inventor developed her invention because she could not find a shopping cart notepad holder in the market. A search revealed several patents that have addressed the issue of providing a notepad holder for a shopping cart. The U.S. Patents are as follows: Amundson, U.S. Pat. No. 4,685,701; Small, U.S. Pat. No. 4,743,050; Hicks, U.S. Pat. No. 3,881,267; and Barlow, U.S. Pat. No. 4,356,651. None of the Patents disclose a compact adjustable dual use shopping cart notepad holder that is securely stable because of their design.

An object of the present invention is to provide a shopper with a shopping cart notepad holder that will allow the user to easily carry the holder in a closed and retracted position.

Another object of the present invention is to provide the user of the shopping cart notepad holder with a tool for shopping that will allow him/her to use the notepad holder as a holder for a first notepad while at the same time allowing him/her to use the holder to entertain the child with another surface to place a second notepad.

A further object of the present invention is to provide a user with a stable shopping cart notepad holder.

SUMMARY

The present invention is a shopping cart notepad holder that provides a user with a tool that allows the user to securely secure two notepads in a fixed and stable position within a shopping cart. The shopping cart notepad holder comprises a first notepad holder. The notepad holder has a first lateral attachment guide. A second notepad holder is attached to the first notepad holder. The second notepad holder has a second lateral attachment guide. The second lateral attachment guide is mounted on the first attachment guide. And, a retractable arm system for attaching the shopping cart notepad holder to a shopping cart, the retractable arm system is housed within and is attached to the first lateral attachment guide.

The present invention might further comprise of an arm guide for securing each arm in a fixed position.

Each notepad holder might define a slit wherein notepads can be secured.

DRAWINGS

These and other features, aspects, and advantages of the present invention will become better understood with regard to the following description, appended claims, and drawings where:

FIG. 2 shows a front view of the shopping cart notepad holder;

FIG. 3 shows a top view of the shopping cart notepad holder, wherein the first notepad holder and the second notepad holder are in a flush position;

FIG. 4 shows a top view of the shopping cart notepad holder, wherein the first and the second notepad holders are in a second position;

FIG. 5 shows a perspective of the first notepad holder, wherein the retractable legs of the shopping cart notepad holder are extended outward;

FIG. 6 shows a perspective of the second notepad holder;

DESCRIPTION

Figure 1:
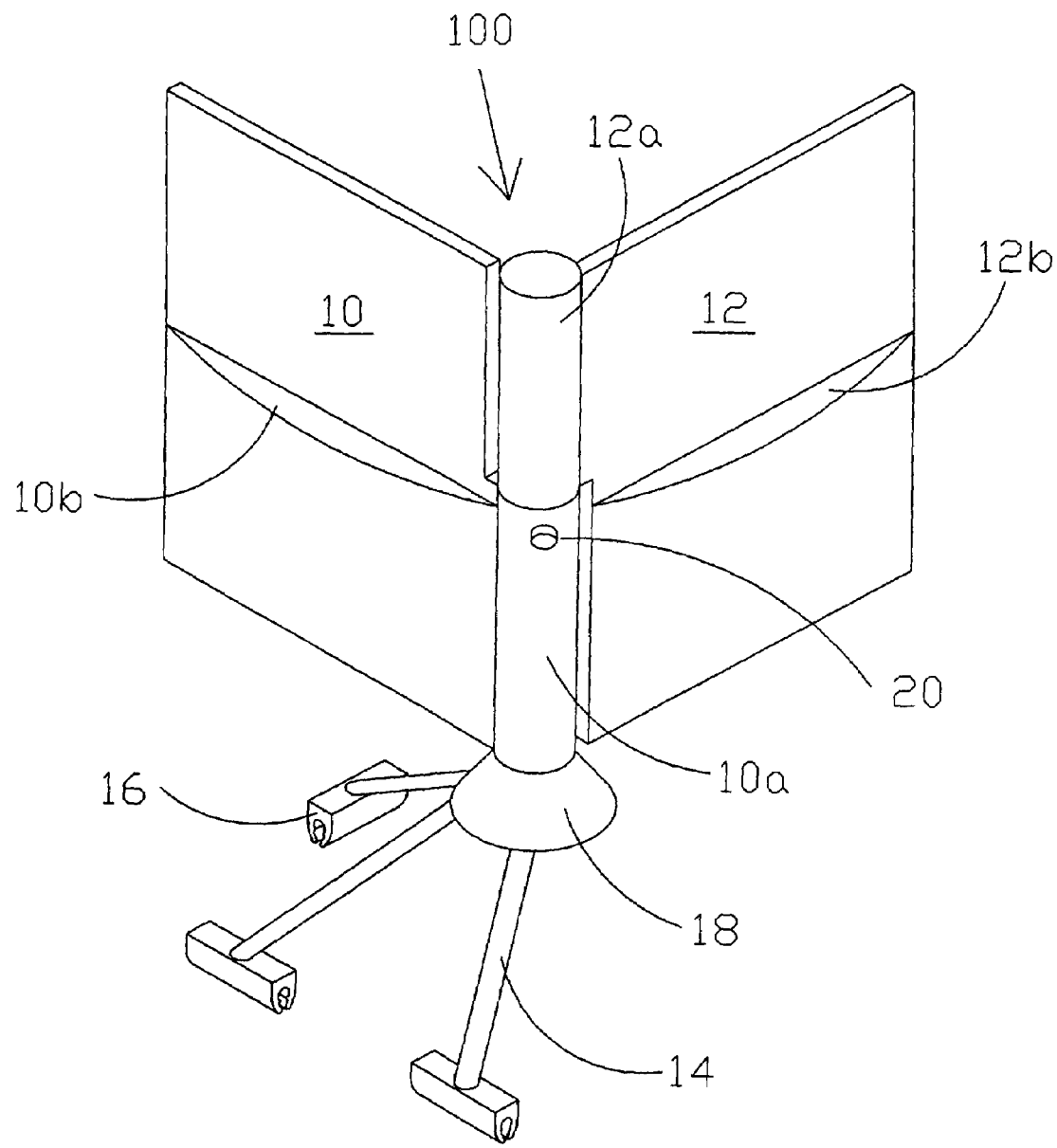
FIG. 1 shows a perspective of a shopping cart notepad holder.
Figure 7:
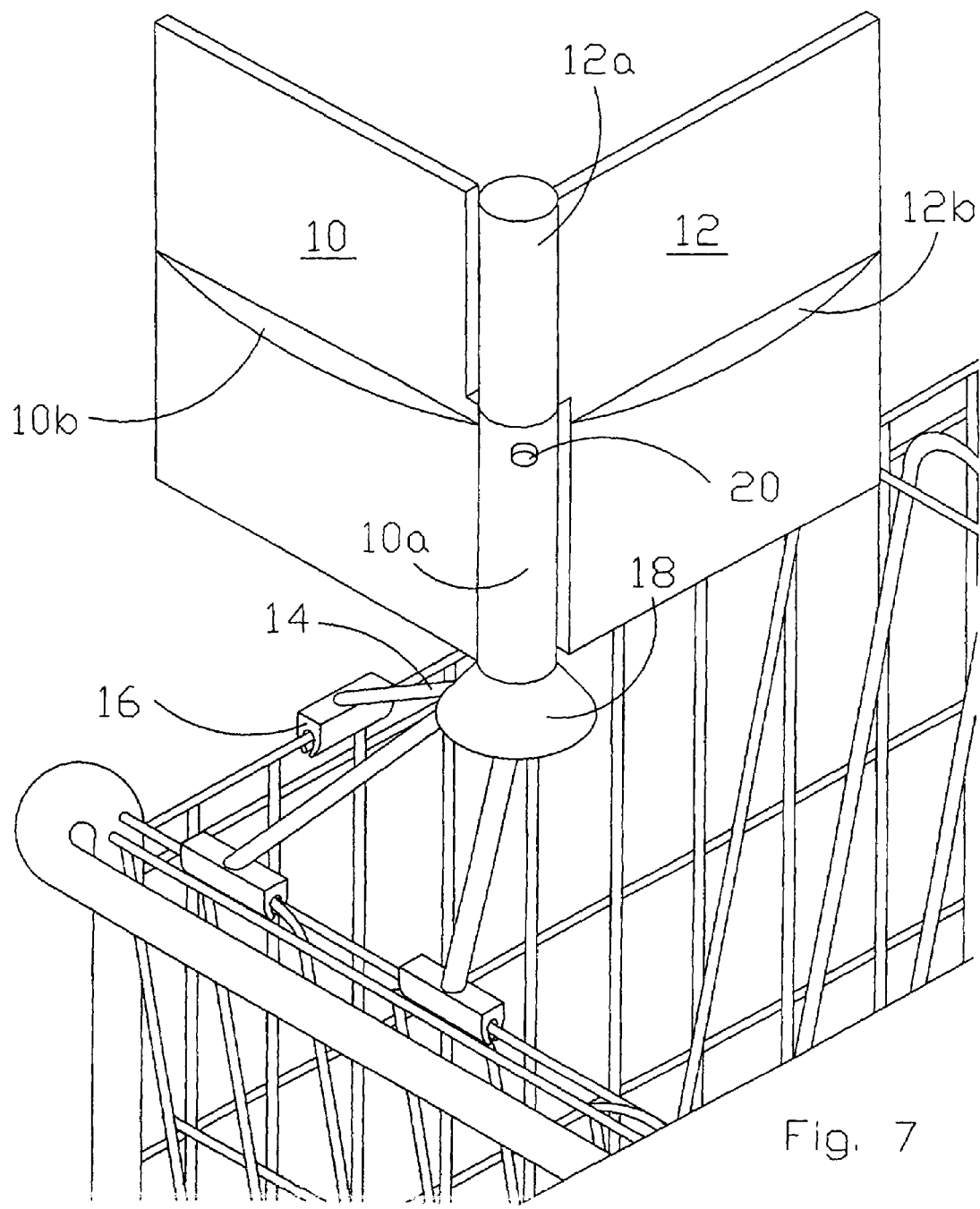
FIG. 7 shows the shopping cart holder in a certain position after being mounted on the shopping cart.
Figure 8:
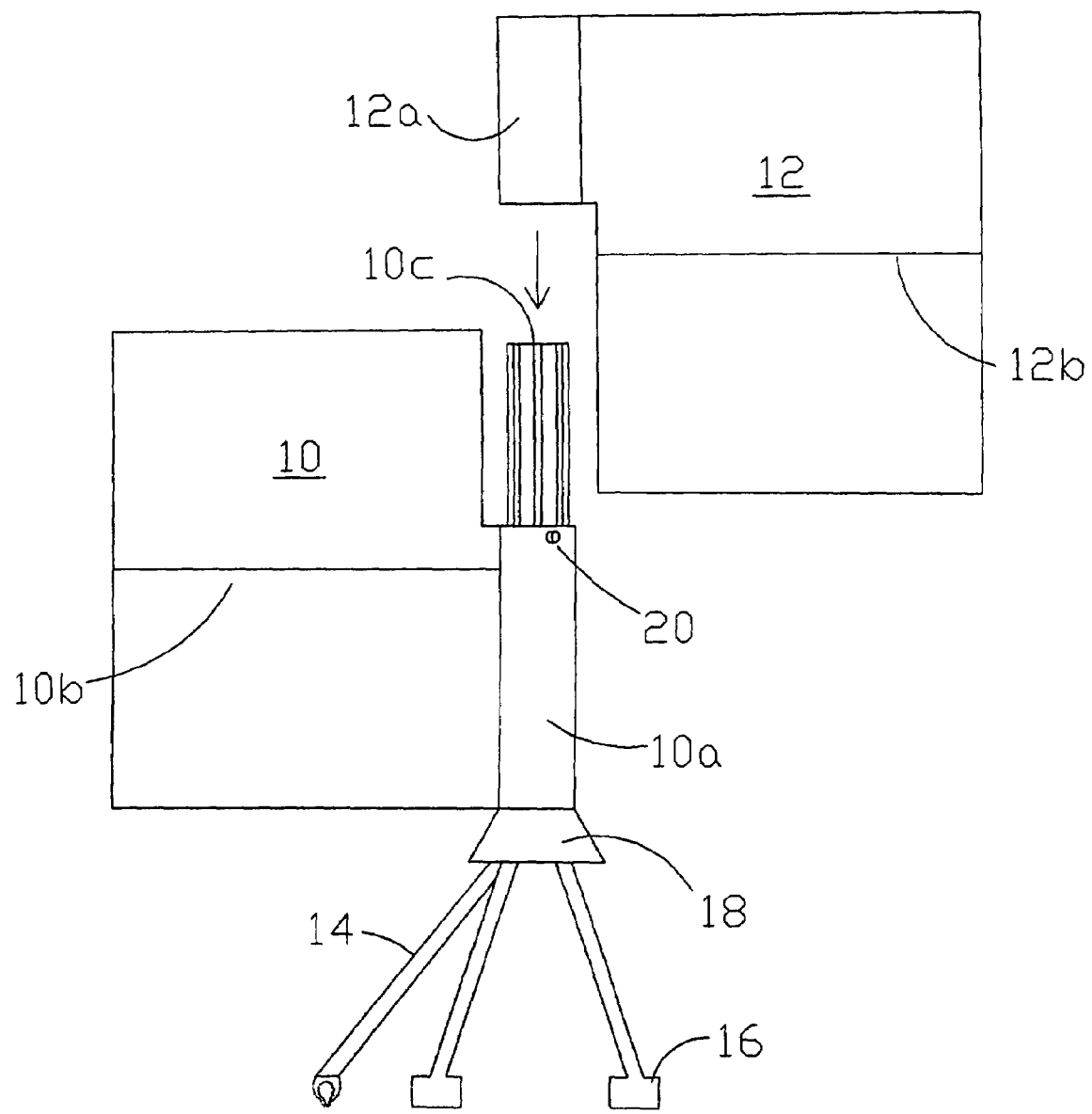
FIG. 8 shows how the second notepad holder is mounted on the first notepad holder of the shopping cart.
Figure 9:
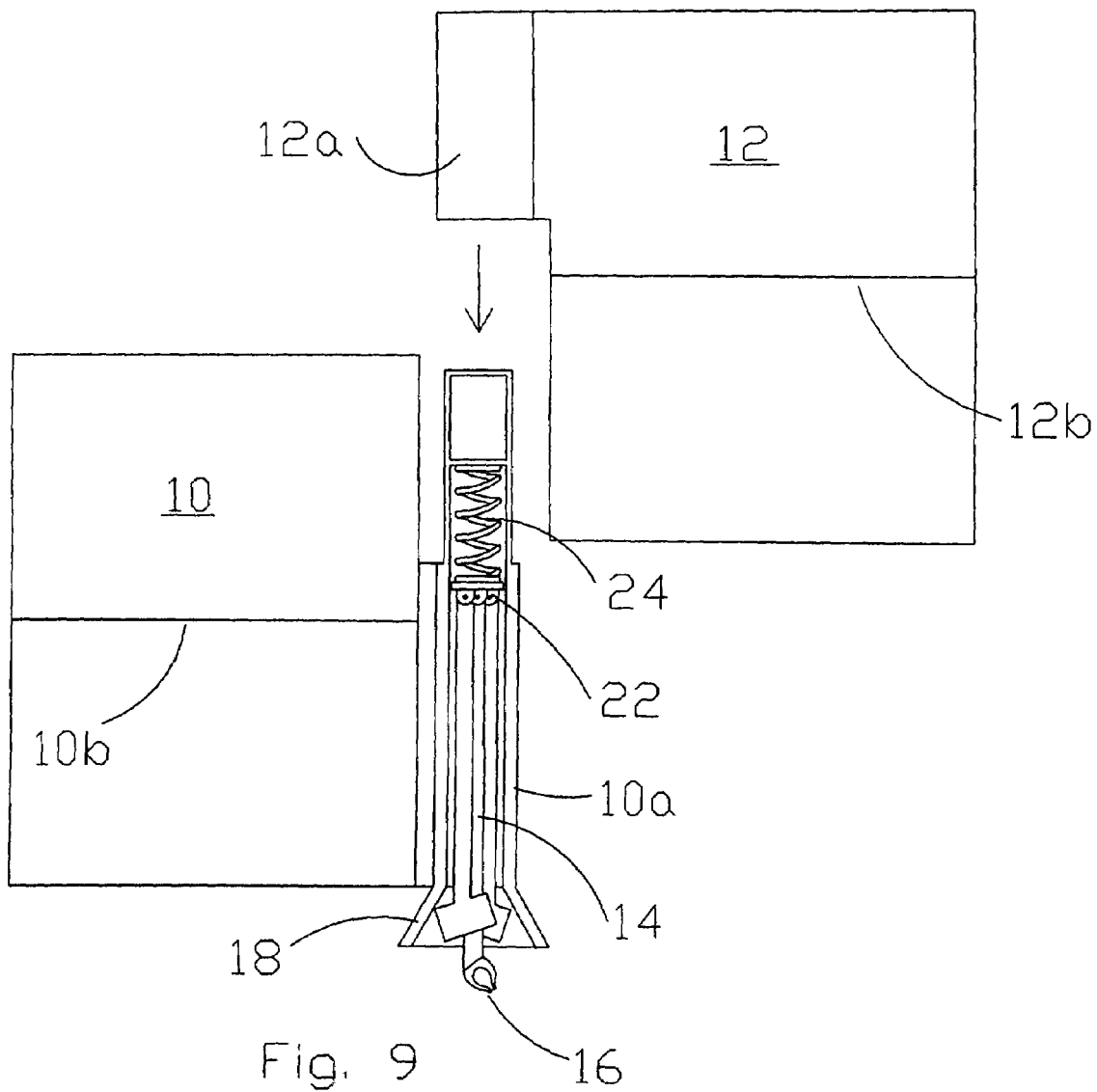
FIG. 9 shows a cut away of the retractable arm system of the shopping cart notepad holder.
Figure 10:
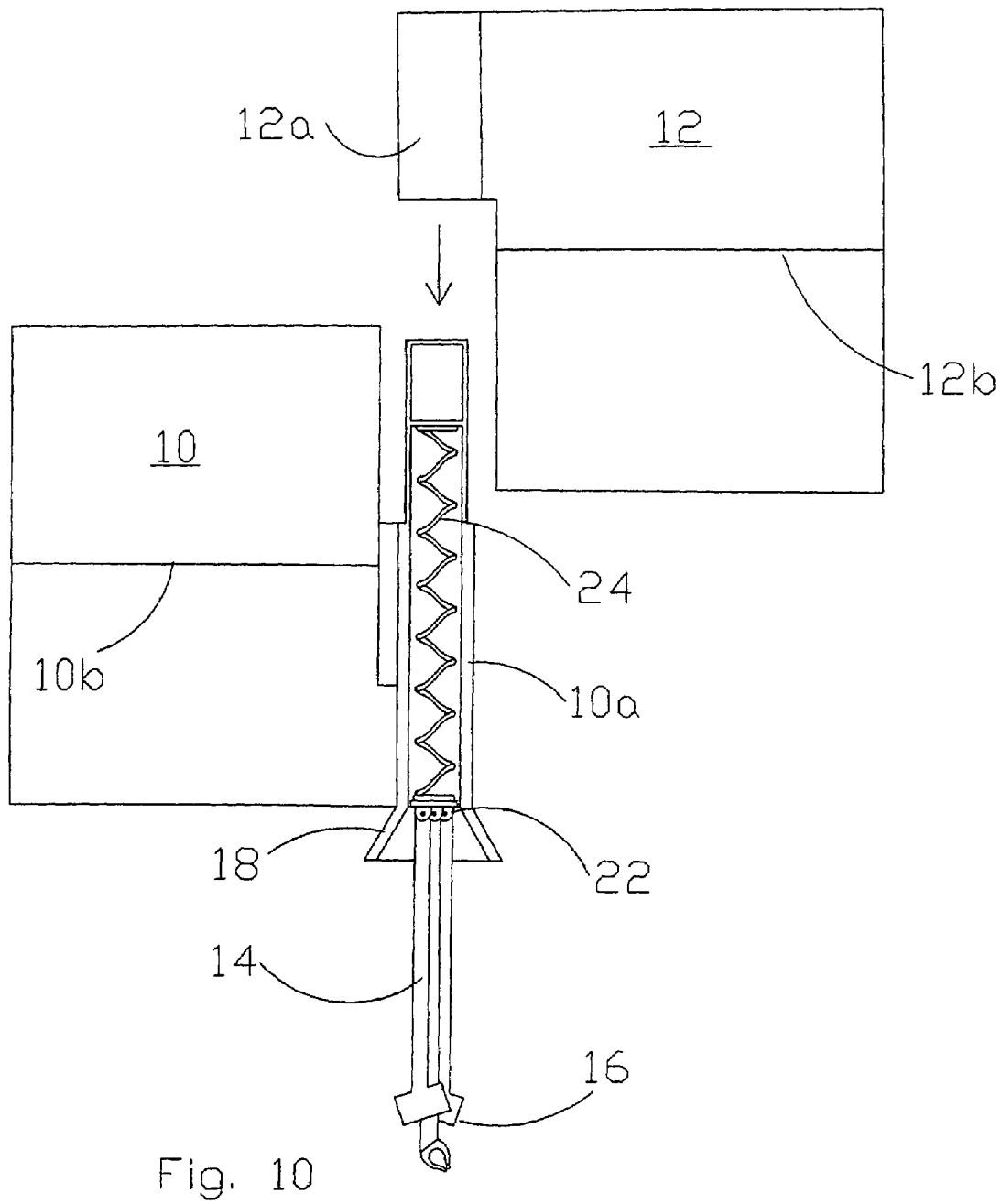
FIG. 10 shows a side view of the shopping cart notepad holder showing how the second notepad holder mounts on the first.
Figure 11:
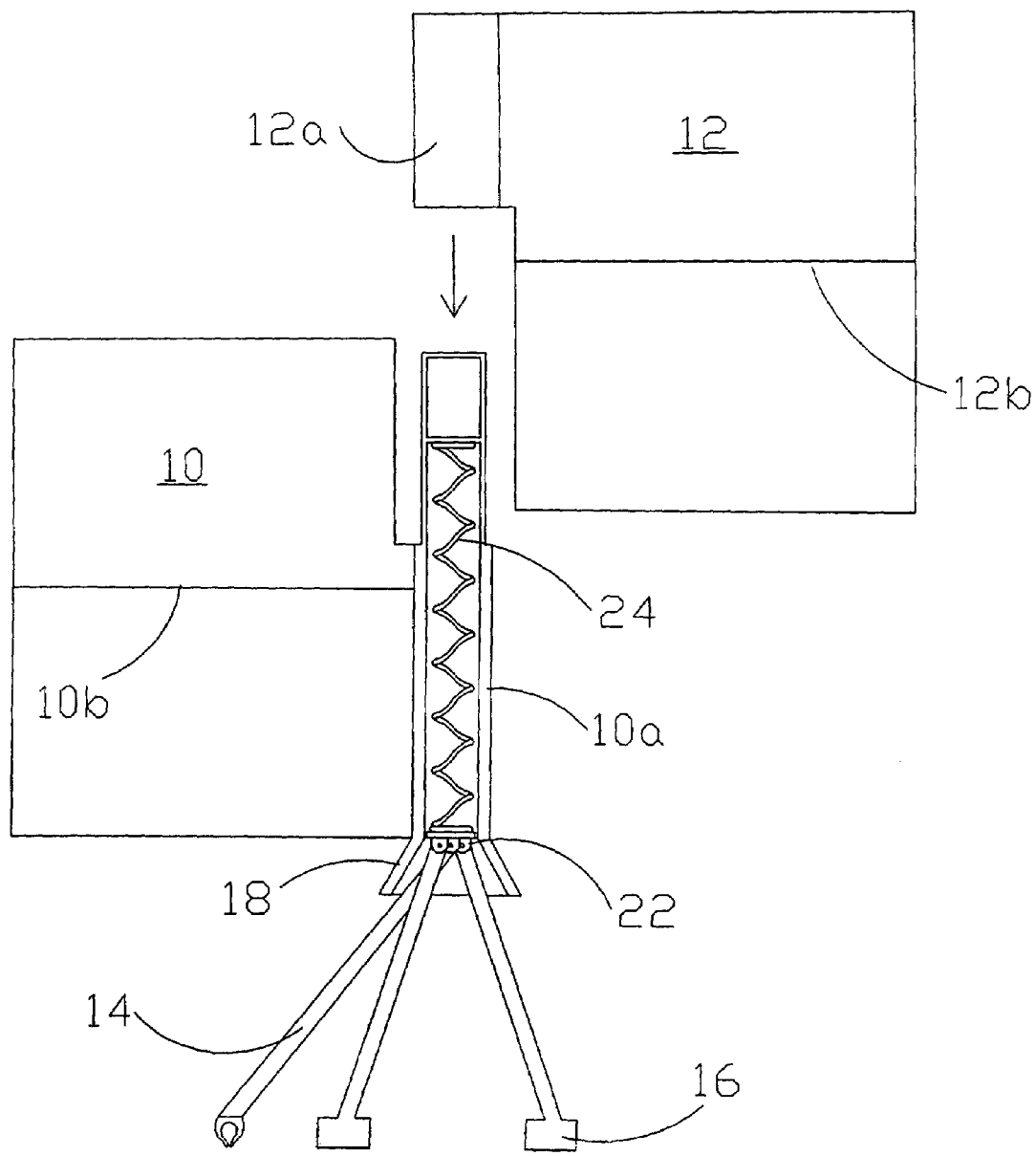
FIG. 11 shows a side view showing how the arms of the shopping cart notepad holder open.
Figure 12:
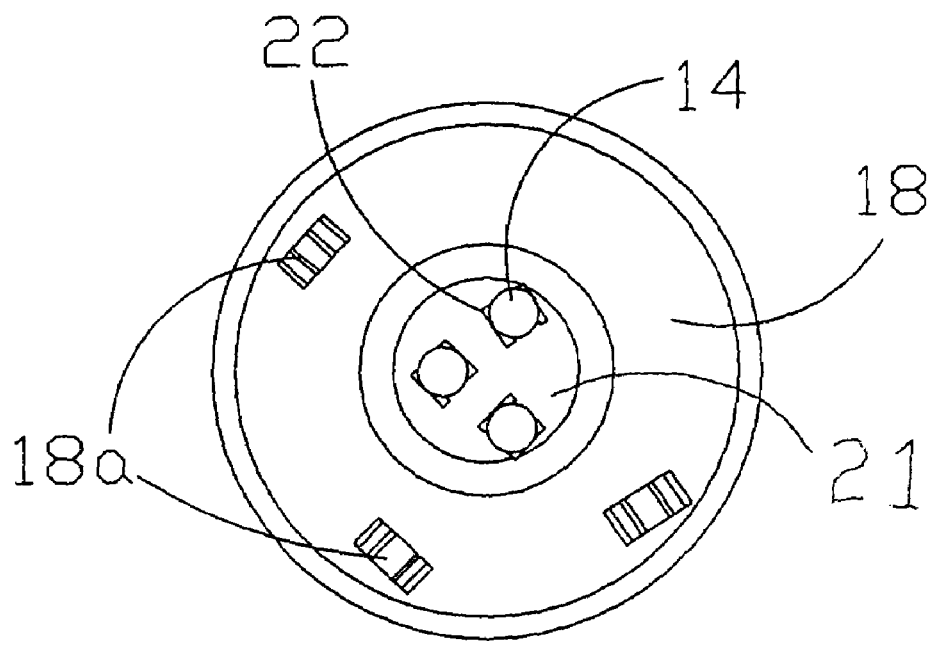
FIG. 12 shows a bottom view of the base, the view shows the hinges of the base and the arm guide.
Figure 13:
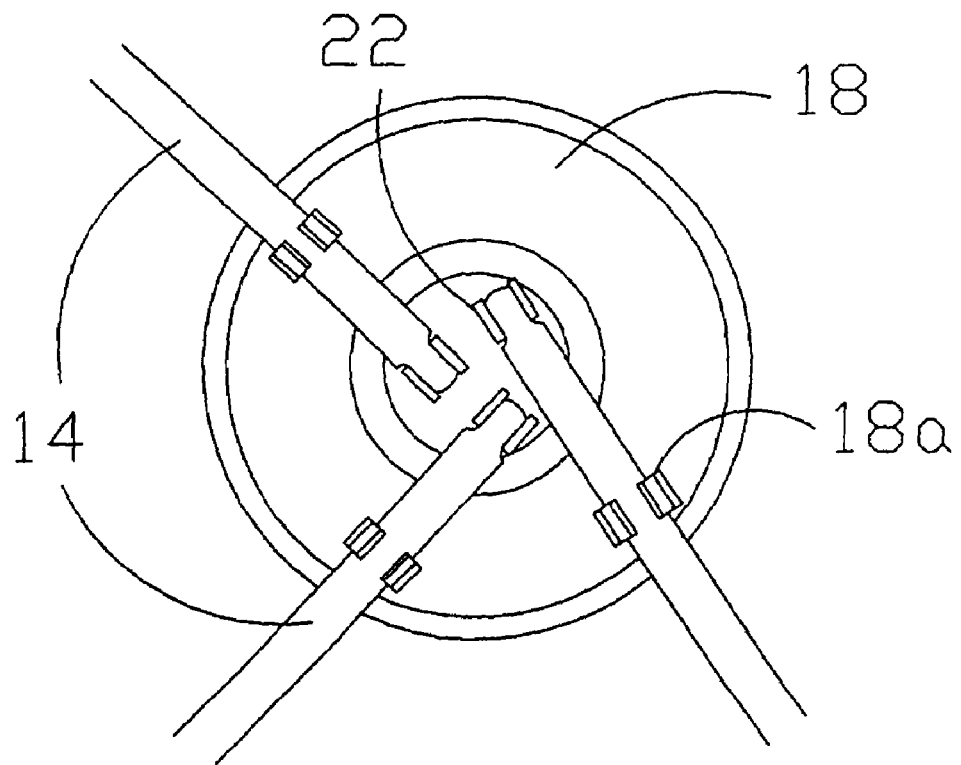
FIG. 13 shows a bottom view of the base and the arm guide, wherein the arms are secured within the arm guide.

As seen in FIGS. 1-3 and 7-11, a shopping cart notepad holder 100, comprising a first notepad holder 10, the first notepad holder 10 has a first lateral attachment guide 10a. A second notepad holder 12, the second notepad holder 12 has a second lateral attachment guide 12a, the second lateral attachment guide 12a is mounted on the first attachment guide 10a. And, as seen in FIGS. 9-13 a retractable arm system (14, 16, 22, and 24) for attaching the shopping cart notepad holder 100 to a shopping cart, the retractable arm system (14, 16, 21, 22, and 24) is housed within and is attached to the first lateral attachment guide 10a.

The first notepad holder 10 is a first rectangular body 10 and the first lateral attachment guide 10a is a first housing 10a attached to one side of the first rectangular body 10. The first housing 10a has a first and a second end. The first end of the first housing 10a is open and a lateral side of the first end of the housing 10a is fixedly attached to the first rectangular body 10. The first end of the first housing 10a also defines a locking mechanism 20. The second end of the first housing 10c is closed and the outside of the second end of the housing 10c is laterally toothed.

The second notepad holder 12 is a second rectangular body 12 and the second lateral attachment guide 12a is a second housing 12a attached to one of the sides of the second rectangular body 12 and runs at least one quarter of the length of the second rectangular body 12 from one of the ends of the second rectangular body 12. The second housing 12a has at least one open end and the inner side of the second housing 12a is laterally toothed so that the teeth of the second housing 12a fit within the teeth of the first housing 10a. The second housing 12a of the second rectangular body is placed over the toothed end of the first housing 10a so that the second rectangular body 12 is placed in a desired position with respect to the first rectangular body 10.

as seen in FIGS. 9-13, the retractable arm system (14, 16, 21, 22, and 24) for attaching the shopping cart notepad holder 100 to a shopping cart comprises of a spring 24, the spring 24 attaches to the inside of the second end of the first housing 10a. A base 21 having two sides, one side of the base attaching to the spring 21, the other side of the base 21 defining three hinges 22. And, three arms 14, one end of each arm 14 attaches to one of the hinges 22, the other end of each arm defines a fastener 16.

In another embodiment of the present invention, the shopping cart notepad holder 100 might further comprise of an arm guide 18 for securing each arm 14 in a fixed position.

In a further embodiment of the present invention, notepad holders 10, 12 might further define a slit 10b wherein notepads can be secured.

An advantage of the present invention is that it provides a shopper with a shopping cart notepad holder that allows the user to easily carry the holder in a closed and retracted position.

Another advantage of the present invention is that it provides the user of the shopping cart notepad holder with a tool for shopping that allows him/her to use the notepad holder as a holder for a first notepad while at the same time allowing him/her to use the holder to entertain the child with another surface to place a second notepad.

A further advantage of the present invention is that it provides a user with a stable shopping cart notepad holder.

Although the present invention has been described in considerable detail with reference to certain preferred versions thereof, other versions are possible. Therefore the spirit and the scope of the claims should not be limited to the description of the preferred versions contained herein.

What is claimed is:

1. A shopping cart notepad holder, comprising:
   a first notepad holder, the first notepad holder has a first lateral attachment guide;
   a second notepad holder, the second notepad holder has a second lateral attachment guide, the second lateral attachment guide is mounted on the first attachment guide; and
   a retractable arm system for attaching the shopping cart notepad holder to a shopping cart, the retractable arm system is housed within and is attached to the first lateral attachment guide.

2. The shopping cart notepad holder of claim 1, wherein the first notepad holder is a first rectangular body and the first lateral attachment guide is a first housing attached to one side of the first rectangular body, the first housing has a first and a second end, the first end of the first housing is open and the lateral side of the first end of the first housing is fixedly attached to the first rectangular body, the first end also defines a locking mechanism, the second end of the first housing is closed and the outside of the first housing's second end is laterally toothed.

3. The shopping cart notepad holder of claim 2, wherein the second notepad holder is a second rectangular body and the second lateral attachment guide is a second housing attached to one of the sides of the second rectangular body and runs at least one quarter of the length of the second rectangular body from one of the ends of the second rectangular body, the second housing has at least one open end and the inner side of the second housing is laterally toothed so that the teeth of the second housing fit within the teeth of the first housing, the second housing of the second rectangular body is placed over the toothed end of the first housing so that the second rectangular body is placed in a desired position with respect to the first rectangular body.

4. The shopping cart notepad holder of claim 3, wherein the retractable arm system for attaching the shopping cart notepad holder to a shopping cart comprises:
   a spring, the spring attaches to the inside of the second end of the first housing;
   a base having two sides, one side of the base attaching to the spring, the other side of the base defining three hinges; and
   three arms, one end of each arm attaches to one of the hinges, the other end of each arm defines a fastener.

5. The shopping cart notepad holder of claim 4, further comprising an arm guide for securing each arm in a fixed position.

6. The shopping cart notepad holder of claim 5, wherein both bodies define a slit wherein a notepad can be secured.

7. The shopping cart notepad holder of claim 4, wherein both bodies define a slit wherein a notepad can be secured.

8. A shopping cart notepad holder, comprising:
   a first rectangular body having a first housing attached to one side of the first rectangular body, the first housing has a first and a second end, the first end is open and the lateral side of the first housing's first end is fixedly attached to the first rectangular body, the first housing first end also defines a locking mechanism, the second end of the first housing is closed and the outside of the first housing's second end is laterally toothed;
   a spring, the spring attaches to the inside of the second end of the first housing;
   a base having two sides, one side of the base attaching to the spring, the other side of the base defining three hinges;
   three arms, one end of each arm attaches to one of the hinges, the other end of each arm defines a fastener; and
   a second rectangular body, the second rectangular body having a second housing attached to one of the sides of the second body and runs at least one quarter of the length of the second rectangular body from one of the ends of the rectangular body, the second housing has at least one open end and the inner side of the second housing is laterally toothed so that the teeth of the second housing fit within the teeth of the first housing, the second housing of the second body is placed over the toothed end of the first housing so that the second rectangular body is placed in a desired position with respect to the first rectangular body.

9. The shopping cart notepad holder of claim 1, further comprising an arm guide for securing each arm in a fixed position.

10. The shopping cart notepad holder of claim 2, wherein both bodies define a slit wherein a notepad can be secured.

11. The shopping cart notepad holder of claim 1, wherein both bodies define a slit wherein a notepad can be secured.

* * * * *